United States Patent
Oshikiri (10) Patent No.: US 10,426,309 B2
(45) Date of Patent: Oct. 1, 2019

(54) ELECTRIC BLOWER AND VACUUM CLEANER

(71) Applicant: Toshiba Lifestyle Products & Services Corporation, Kawasaki-shi (JP)

(72) Inventor: Go Oshikiri, Aichi-ken (JP)

(73) Assignee: Toshiba Lifestyle Products & Services Corporation, Kawasaki-shi (JP)

( * ) Notice: Subject to any disclaimer, the term of this patent is extended or adjusted under 35 U.S.C. 154(b) by 308 days.

(21) Appl. No.: 15/416,088

(22) Filed: Jan. 26, 2017

(65) Prior Publication Data
US 2017/0231451 A1 Aug. 17, 2017

(30) Foreign Application Priority Data

Feb. 17, 2016 (JP) .................................. 2016-028187

(51) Int. Cl.
| | |
|---|---|
| *H02K 23/64* | (2006.01) |
| *A47L 9/28* | (2006.01) |
| *A47L 5/28* | (2006.01) |
| *A47L 9/16* | (2006.01) |
| *A47L 9/22* | (2006.01) |

(Continued)

(52) U.S. Cl.
CPC .............. *A47L 9/2842* (2013.01); *A47L 5/28* (2013.01); *A47L 9/16* (2013.01); *A47L 9/22* (2013.01); *H02K 1/14* (2013.01); *H02K 1/141* (2013.01); *H02K 1/185* (2013.01); *H02K 1/2706* (2013.01); *H02K 3/34* (2013.01); *H02K 5/04* (2013.01); *H02K 5/10* (2013.01); *H02K 5/26* (2013.01); *H02K 7/14* (2013.01); *H02K 3/18* (2013.01); *H02K 5/225* (2013.01); *H02K 11/215* (2016.01); *H02K 11/33* (2016.01)

(58) Field of Classification Search
CPC .. H02K 3/24; H02K 3/34; H02K 1/14; H02K 1/2706; H02K 7/14; H02K 5/04
USPC .......... 310/65, 49.08, 158, 216.021, 216.125
See application file for complete search history.

(56) References Cited

U.S. PATENT DOCUMENTS

| | | |
|---|---|---|
| 3,041,487 A | 6/1962 | Hurst |
| 4,134,036 A | 1/1979 | Curtiss |

(Continued)

FOREIGN PATENT DOCUMENTS

| | | |
|---|---|---|
| CN | 104205568 A | 12/2014 |
| DE | 10 2011 052 131 A1 | 1/2013 |

(Continued)

OTHER PUBLICATIONS

Office Action dated Aug. 16, 2018 in European Patent Application No. 17 152 915.9.

*Primary Examiner* — Hanh N Nguyen
(74) *Attorney, Agent, or Firm* — Oblon, McClelland, Maier & Neustadt, L.L.P.

(57) ABSTRACT

An electric blower comprising:
an electric motor; and
a fan rotated by the electric motor,
wherein
the electric motor includes a stator, a rotor connected to the fan, and a frame accommodating the stator and the rotor,
the stator includes a plurality of stator cores respectively having a core tooth portion facing the rotor, a coil portion attached to the stator core to form a magnetic pole at the core tooth portion, and a spacer inserted between the stator cores to press the stator cores against the frame, and (Continued)

the frame includes a regulation portion regulating position of the stator core pressed by the spacer.

14 Claims, 7 Drawing Sheets

(51) Int. Cl.
*H02K 1/14* (2006.01)
*H02K 1/27* (2006.01)
*H02K 3/34* (2006.01)
*H02K 7/14* (2006.01)
*H02K 5/04* (2006.01)
*H02K 5/26* (2006.01)
*H02K 5/10* (2006.01)
*H02K 1/18* (2006.01)
*H02K 11/215* (2016.01)
*H02K 11/33* (2016.01)
*H02K 3/18* (2006.01)
*H02K 5/22* (2006.01)

(56) References Cited

U.S. PATENT DOCUMENTS

| 2011/0043067 A1* | 2/2011 | Li .......................... H02K 1/141 310/158 |
| 2013/0249330 A1 | 9/2013 | King et al. |
| 2015/0351599 A1 | 12/2015 | Park et al. |

FOREIGN PATENT DOCUMENTS

| EP | 1 835 595 A2 | 9/2007 |
| EP | 2 961 038 A1 | 12/2015 |
| JP | 2013-201893 | 10/2013 |

* cited by examiner

ELECTRIC BLOWER AND VACUUM CLEANER

CROSS-REFERENCE TO RELATED APPLICATIONS

This application is based upon and claims the benefit of priority from the prior Japanese Patent Application No. 2016-028187 filed on Feb. 17, 2016, the entire contents of which are incorporated herein by reference.

FIELD

Embodiments of the invention relate to an electric blower including a fan rotated by an electric motor and a vacuum cleaner including the same.

BACKGROUND

Recently, a brushless DC motor is known as an electric motor for an electric blower using a battery as a power source and used in, for example, a stick-type small vacuum cleaner.

Such a brushless DC motor has a configuration in which a rotor forming a plurality of rotary magnetic poles by a permanent magnet is disposed to be rotatable inside a stator forming a fixed magnetic pole.

In such a brushless DC motor, for example, a stator core is divided into a plurality of segments in order to improve workability of a coil or improve assemblability.

At this time, for example, anchor portions are respectively provided at ends of the stator cores formed by winding coils thereon and a resinous bridge portion is molded between the anchor portions so that the structure is connected and integrated with each other and the stator cores are positioned.

However, in this case, since the bridge portion is molded after the coils are wound on the stator cores, there is concern that a thermal load or a mechanical load may be applied to the coil. As a result, reliability is degraded.

DETAILED DESCRIPTION

Hereinafter, a configuration of an embodiment will be described with reference to FIGS. 1 to 7.

Figure 7:
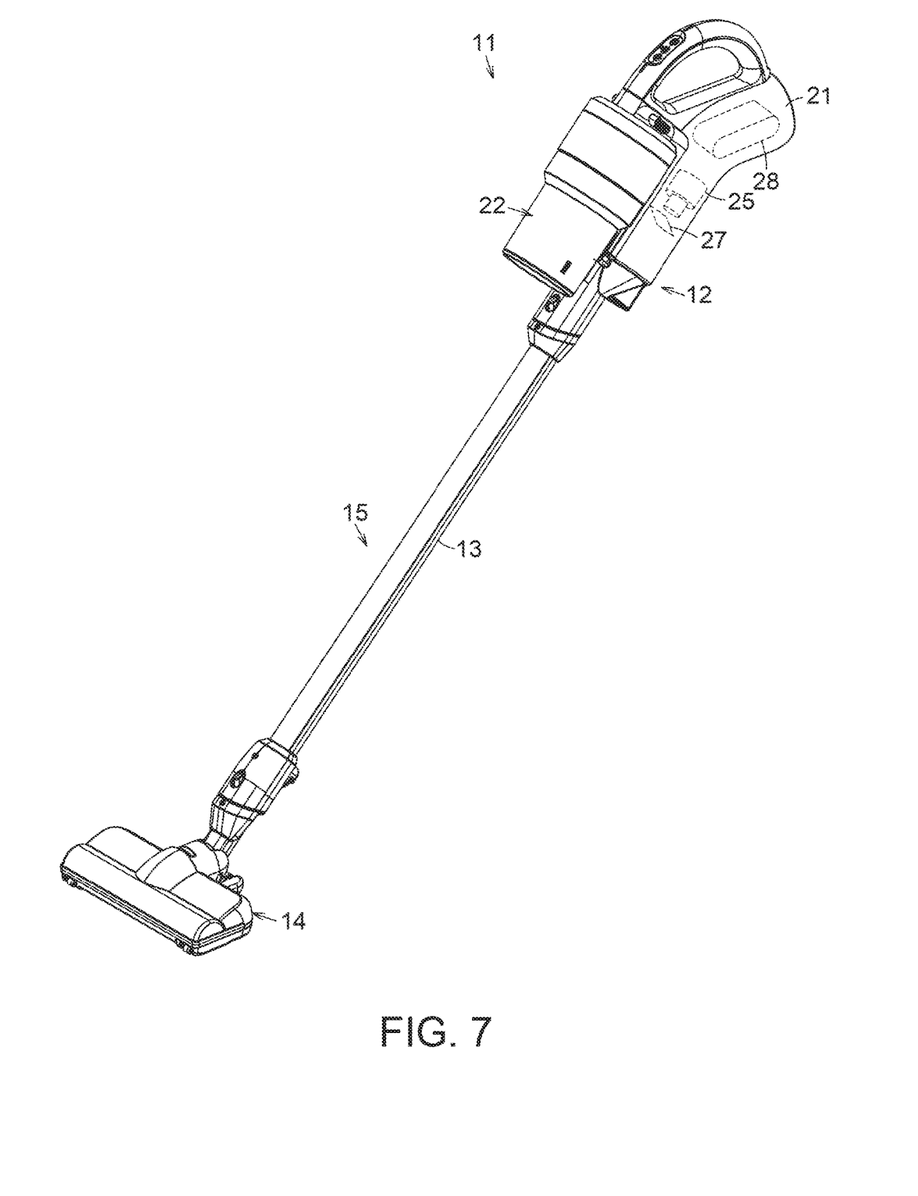
FIG. 7 is a perspective view illustrating a vacuum cleaner including the electric blower.

In FIG. 7, Reference Sign 11 indicates a vacuum cleaner and the vacuum cleaner 11 constitutes a vacuum cleaning machine together with a support device (which is a charging stand and is not illustrated in the drawings) which supports the vacuum cleaner 11 in an accommodation state when the vacuum cleaner is not used for a cleaning operation.

Then, in the embodiment, the vacuum cleaner 11 is a so-called stick type vacuum cleaner which includes a cleaner body 12, an air duct 15 including an extension pipe 13 serving as an elongated pipe part directly connected to the cleaner body 12 and a floor brush 14 serving as a suction port suctioning dust on a cleaning object face.

The cleaner body 12 includes, for example, a main body 21 and a dust collection device 22 which serves as a dust collection part removably attached to the main body 21. The main body 21 includes therein an electric blower 25, a controller 27 which is, for example, a microcomputer controlling an operation of the electric blower 25, and a battery 28 which is a power source. For example, the dust collection device 22 is a device to separate dust which is suctioned along with air by the operation of the electric blower 25 and to trap the dust. The dust collection device 22 can arbitrarily employ, for example, a type using a filter or a type of straight separation. However, in the embodiment, for example, a dust collection cup of cylindrical shape which separates dust in a centrifugal manner (a cyclone separation manner) is used.

Then, as illustrated in FIGS. 4 to 6A, the electric blower 25 is integrally provided with an electric motor 31, a centrifugal fan 32 which is a fan rotated by the electric motor 31, a diffuser 33 which is a straightening member (flow control member) interposed between the electric motor 31 and the centrifugal fan 32, and a fan cover 34 which covers the centrifugal fan 32.

Figure 1:
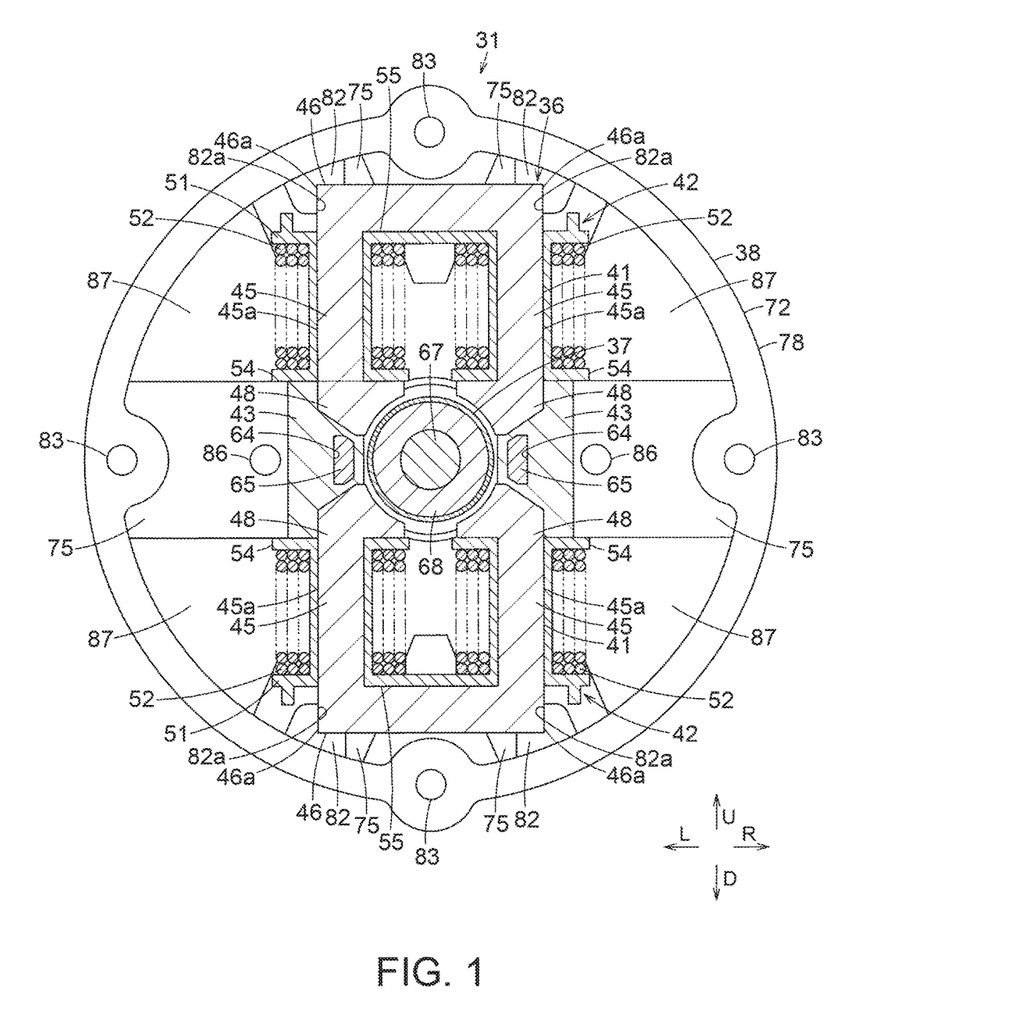
FIG. 1 is a cross-sectional view illustrating an electric motor of an electric blower of an embodiment.

The electric motor 31 is, for example, a brushless motor and includes a stator 36, a rotor 37 which is rotated by the stator 36, and a substantially cylindrical frame 38 which accommodates the stator 36 and the rotor 37 as illustrated in FIG. 1. Then, an operation of the electric motor 31 is controlled by a control circuit (not illustrated). Hereinafter, a description will be made on the assumption that the vertical direction and the lateral direction illustrated in FIG. 1 are set as the vertical direction (indicated by the arrow U and the arrow D) and the lateral direction (indicated by the arrow L and the arrow R) of the electric blower 25 (the electric motor 31), the side of the electric motor 31 in the axial direction of the electric blower 25 is set as the rear direction (indicated by the arrow RR in FIG. 4 and the like), and the side of the centrifugal fan 32 is set as the front direction (indicated by the arrow FR in FIG. 4 and the like).

The stator 36 is used to form a magnetic pole (a fixed magnetic pole) rotating the rotor 37 and includes a plurality of, for example, a pair of stator cores 41 and 41, coil portions 42 and 42 which are respectively attached to the stator cores 41 and 41, and spacers 43 and 43 which are interposed between the stator cores 41 and 41. Then, the stator 36 has a configuration in which the stator cores 41 are disposed radially in the radial direction of the frame 38 within the frame 38 and the stator cores 41 and 41 are disposed to be separated from each other in the vertical direction in the embodiment.

Each of one and the other stator cores 41 is formed of a magnetic body such as an electromagnetic steel plate and is formed in a substantially C-shape by a pair of core portions 45 and 45 which are disposed in substantially parallel to each other and a connection portion 46 connecting one ends of the core portions 45 and 45 to each other.

Figure 2:
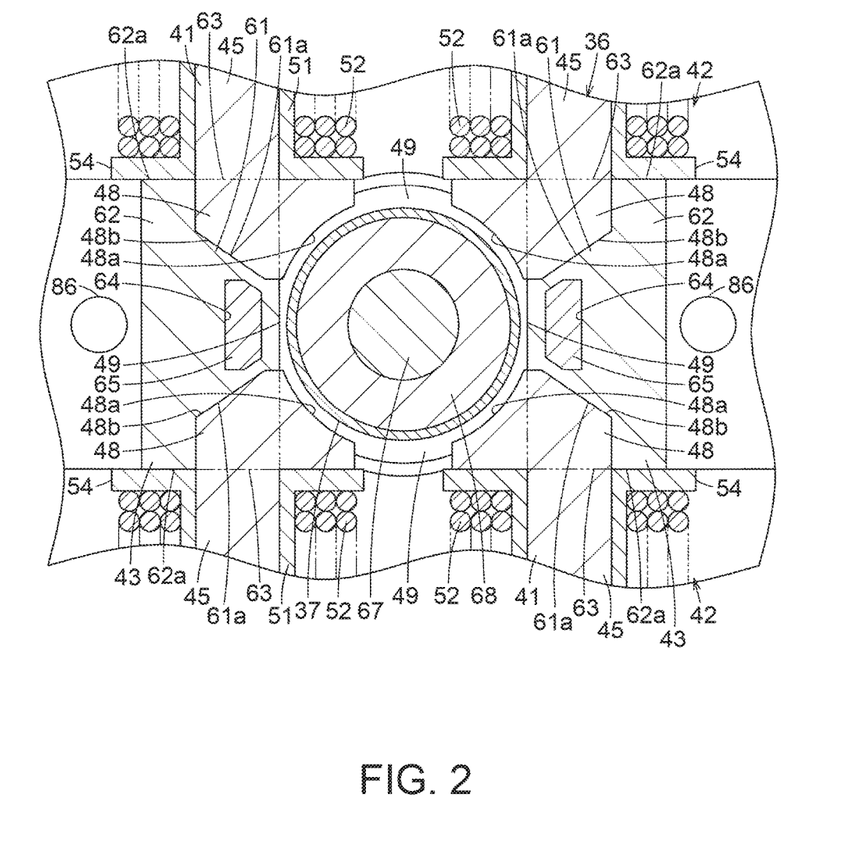
FIG. 2 is an enlarged cross-sectional view of a part of FIG. 1.

The core portions 45 and 45 are disposed in the vertical direction to be located at the left and right sides of the rotor 37. The other ends of the core portions 45 are respectively provided with core tooth portions 48 protruding to face the rotor 37. The core tooth portions 48 protrude toward the rotor 37 and are separated from each other in the horizontal direction. Further, as illustrated in FIG. 2, each core tooth portion 48 includes a magnetic action face 48*a* (magnetic pole face) which faces an outer peripheral face of the rotor 37 and a pressing object face 48*b* which is a portion to be pressed continuous to the magnetic action face 48*a* and an outer face 45*a* of the core portion 45. Then, a gap between the core tooth portions 48 and 48 which are separated from each other in the horizontal direction of each stator core 41 and a gap between the core tooth portions 48 and 48 of the stator cores 41 and 41 separated from each other in the vertical direction are respectively formed as slot openings 49.

A magnetic pole is formed at the core tooth portion 48 by the coil portion 42. The magnetic action face 48*a* is used to apply the magnetic pole to the rotor 37 and is curved in a circular-arc shape along the outer peripheral face of the rotor 37. The magnetic action face 48*a* is separated from the outer peripheral face of the rotor 37 with a slight gap interposed therebetween.

The pressing object face 48*b* is a portion which contacts the spacer 43 and is pressed by the spacer 43 and has a slope which is inclined to be separated from a virtual line formed in the horizontal direction passing through the center axis of the rotor 37 (the frame 38) as it goes away from the rotor 37 (the magnetic action face 48*a*). That is, the slope is inclined toward the outside.

The connection portion 46 illustrated in FIG. 1 is disposed in the horizontal direction, that is, a direction substantially orthogonal to the core portions 45 and 45. Then, since both left and right ends of the connection portion 46 are supported by the frame 38, the stators 36 are supported by the frame 38 so as not to be rotatable in the circumferential direction.

Thus, both ends of the stator core 41 facing the frame 38 are provided with corner portions 46*a* and 46*a* having a polygonal shape (a square shape) and the spacers 43 and 43 hold the stator core 41 from the opposite ends (the core tooth portions 48, 48, 48, and 48).

Figure 3A:
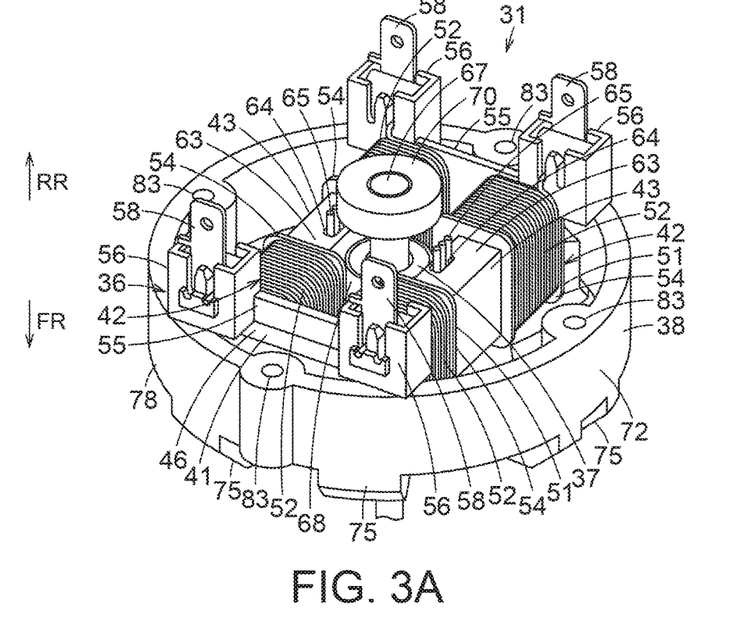
FIG. 3A is a perspective view illustrating a part of the electric motor and FIG. 3B is a perspective view illustrating a part of FIG. 3A.
Figure 3B:
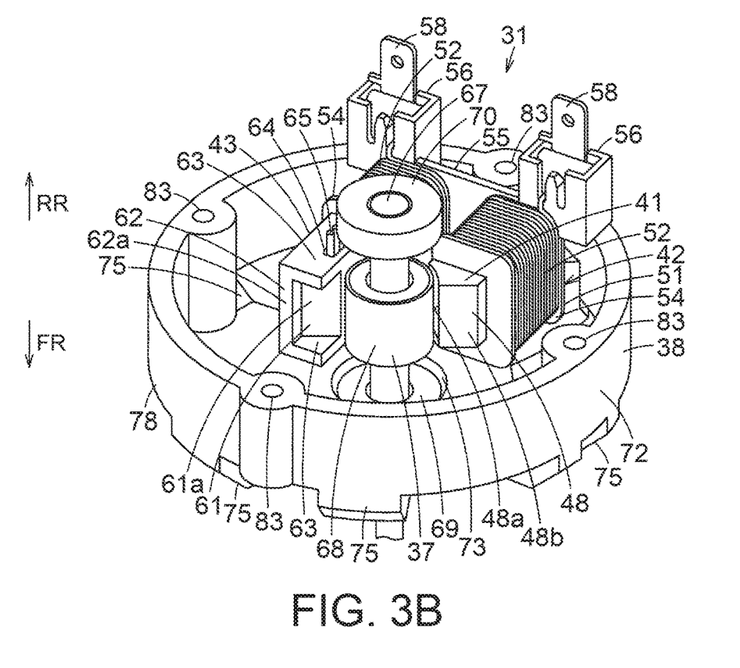

Each of the coil portions 42 illustrated in FIG. 1 and FIGS. 3A and 3B includes an insulation body 51 which is attached to the stator core 41 and a coil 52 which is wound on the insulation body 51.

The insulation body 51 is integrally provided with a rectangular cylindrical insulation body part 54 through which each core portion 45 of the stator core 41 is inserted, an insulation body connection portion 55 which is connected to the insulation body part 54, and terminal portions 56 and 56 which are provided in the insulation body connection portion 55. Then, the insulation body 51 is integrally fixed to the stator core 41, for example, by insert-molding.

The insulation body part 54 is formed in a bobbin shape and is attached to cover an entire position of the connection portion 46 side in relation to the core tooth portion 48 of each core portion 45 of the stator core 41.

The insulation body connection portion 55 is disposed along the connection portion 46 of the stator core 41, that is, along the horizontal direction.

The terminal portions 56 and 56 protrude at the rear side of the insulation body connection portion 55, which is the opposite side of the centrifugal fan 32, and stack on both left and right ends of the connection portion 46 of the stator core 41. The terminals 58 and 58 which are electrically connected to the control circuit are inserted into the terminal portions 56 and 56. The terminals 58 and 58 are attached to the terminal portions 56 and 56 in a nipped state while the ends of the coils 52 and 52 respectively wound on the insulation body parts 54 and 54 are electrically connected thereto.

The coil 52 is formed by covering a surface of a conductor by an insulation coating and is multiply wound on each insulation body part 54 of the insulation body 51.

The spacers 43 illustrated in FIG. 1 press the stator cores 41 and 41 of the stator 36 against the frame 38 to be positioned and is formed of, for example, a non-magnetic material such as PBT (polybutylene terephthalate) which is softer than the frame 38. These spacers 43 and 43 are located at the left and right sides of the stator cores 41 and 41 and are respectively pressed in the opposite directions in the radial direction of the frame 38 so that one spacer 43 presses the left side of the stator cores 41 and 41 and the other spacer 43 presses the right side of the stator cores 41 and 41. That is, when each spacer 43 presses one (the other) stator core 41 against the frame 38, the other (one) stator core 41 is pressed against the frame 38 by a reaction force transmitted from the frame 38 through the stator core 41.

Figure 4:
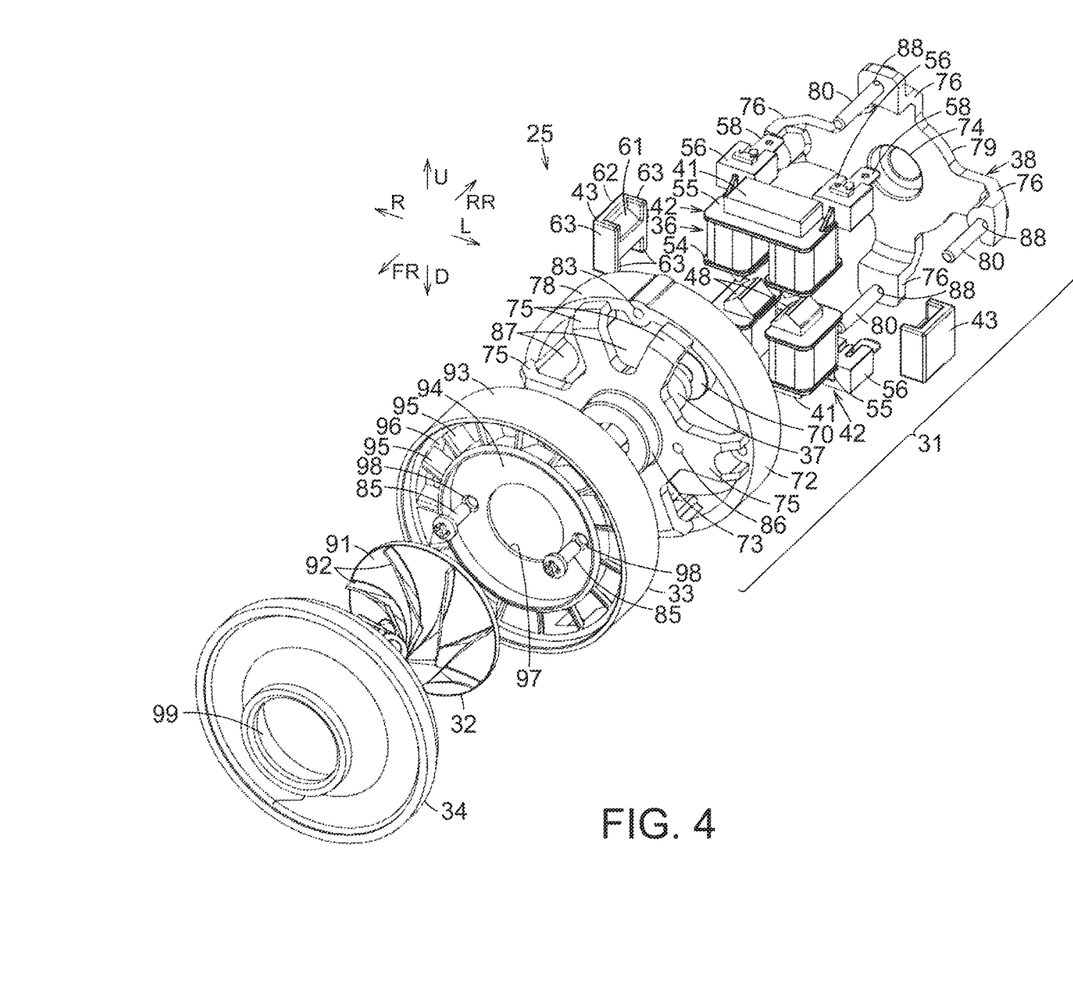
FIG. 4 is an exploded perspective view illustrating the electric blower when viewed from a fan.
Figure 5:
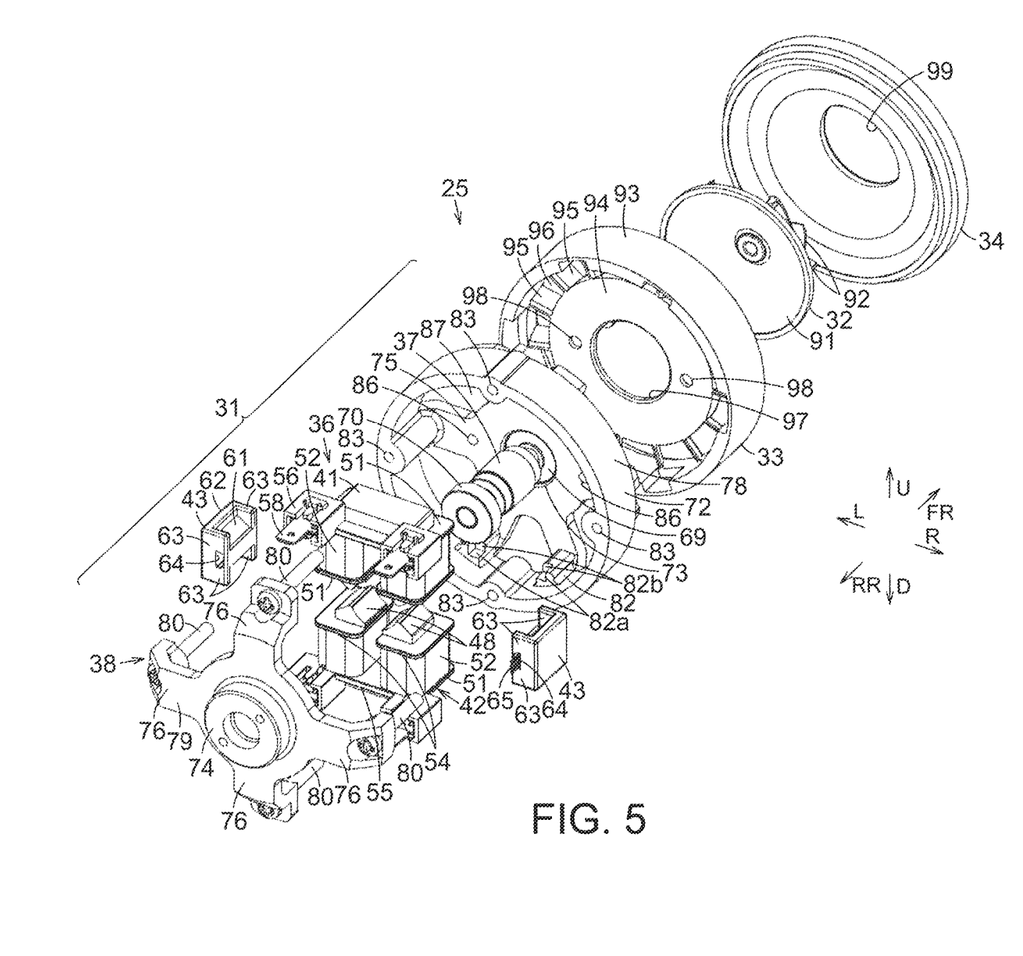
FIG. 5 is an exploded perspective view illustrating the electric blower when viewed from the electric motor.

Specifically, as illustrated in FIGS. 2, 4, and 5, each of the spacers 43 is integrally provided with a core contact portion 61 which contacts the stator core 41 (the core tooth portion 48 (the pressing object face 48*b*)), an insulation body contact portion 62 which contacts the insulation body 51, and core regulation portions 63 and 63 which respectively regulate the positions of the stator cores 41 and 41 in the axial direction (the longitudinal direction, namely, front/rear direction) of the electric blower 25. Thus, the spacers 43 and 43 are respectively located to be filled between the stator cores 41 and 41 and between the insulation bodies 51 and 51 of the coil portions 42 and 42. In other words, these spacers 43 and 43 are located to fill a gap between the stator cores 41 and 41 and a gap between the insulation bodies 51 and 51 of the coil portions 42 and 42. Further, an accommodation part 64 is formed in a recessed shape in each of the spacers 43 and a position detector (a rotation position detection sensor) 65 which detects the rotation position of the rotor 37 is accommodated in the accommodation part 64.

As illustrated in FIG. 2, the core contact portion 61 is located to be continuous between the core tooth portions 48 and 48 (the pressing object faces 48*b* and 48*b*) of the stator cores 41 and 41 facing each other in the vertical direction. The core contact portion 61 is provided with contact faces 61*a* and 61*a* which are provided at the upper and lower side portions, and are used as contact portions contacting the pressing object faces 48*b* and 48*b* of the core tooth portions 48 and 48 of the stator cores 41 and 41 which face each other in the vertical direction. These contact faces 61*a* and 61*a* are inclined to close to each other toward the rotor 37. Here, a direction of a force of press-inserting each spacer 43 between the core tooth portions 48 and 48 of the stator cores 41 and 41 toward the rotor 37 is changed so that a force of pressing the stator cores 41 and 41 toward the frame 38 in the radial direction is generated. Thus, the core contact portion 61 is formed to have a trapezoidal cross-section of which a width is gradually narrowed toward the rotor 37.

The insulation body contact portion 62 is located to be continuous between the insulation body parts 54 and 54 of the insulation bodies 51 and 51 which face each other in the vertical direction. The insulation body contact portion 62 includes contact faces 62*a* and 62*a* which are provided at the upper and lower side portions and contact the insulation bodies 51 and 51 in the radial direction of the frame 38.

The core regulation portions 63 and 63 are formed in a plate shape covering the contact faces 61*a* and 61*a* of the core contact portion 61 in the longitudinal direction (FIGS. 4 and 5). Then, the core regulation portions 63 and 63 are formed to cover the core tooth portions 48 and 48 of the stator cores 41 and 41 which face each other in the vertical direction in such a manner that each spacer 43 is press-inserted between the stator cores 41 and 41. Thus, since each spacer 43 is press-inserted between the stator cores 41 and 41, the stator cores 41 and 41 are bridged in the vertical direction.

The accommodation part 64 is formed at a position near the rotor 37 at the rear portion of the core contact portion 61 to be recessed in the axial direction (the longitudinal direction) of the rotor 37.

The position detector 65 is used to detect a rotation position (a rotation angle) of the rotor 37 by detecting the polarity of the magnetic pole of the rotor 37. Here, the position detector is, for example, a hall IC and is, in the embodiment, a lead component. When the position detection unit is inserted into the accommodation part 64, the lead portion is drawn to the outside of the accommodation part 64. Thus, these position detectors 65 and 65 are located at the slot openings 49 and 49 between the upper and lower stator cores 41 and 41 (the core tooth portions 48 and 48) and face the outer peripheral face of the rotor at a near position separated from the outer peripheral face of the rotor 37. That is, these position detectors 65 and 65 are located at the opposite sides (the left and right sides) with the rotor 37 interposed therebetween.

As illustrated in FIG. 3B, the rotor 37 includes a rotation shaft 67 which is an output shaft connected to the centrifugal fan 32 (FIG. 4) and a magnet portion 68 which is a rotor body integrally formed with the periphery of the rotation shaft 67. Then, the rotor 37 is held by the frame 38 to be rotatable through bearings 69 and 70.

The rotation shaft 67 is located along the center axis of the frame 38. The rotation shaft 67 is formed such that a front end side protrudes forward with respect to the frame 38 and the centrifugal fan 32 (FIG. 4) is connected to the protruding front end side.

A permanent magnet (not illustrated) is buried in the magnet portion 68 and magnetic poles (rotary magnetic poles) having different polarities are formed to be adjacent to each other in the rotation direction (the circumferential direction). Thus, N and S poles are sequentially and alternately arranged in the rotation direction of the magnet portion 68 so that N and S poles make a pair.

The bearing 69 is attached to the front end side of the rotation shaft 67 and the bearing 70 is attached to the rear end of the rotation shaft 67. These bearings 69 and 70 are respectively fixed to the frame 38 so that the rotor 37 is rotatably held by the frame 38.

The frame 38 illustrated in FIGS. 1 to 5 is formed of, for example, light metal such as aluminum or magnesium or synthetic resin such as BMC (FRP). As schematically illustrated in FIGS. 4 and 5, the frame 38 includes an annular outer frame portion 72, one and the other bearing portions 73 and 74 (shaft receiving portions) which support the bearings 69 and 70 to rotatably support the rotor 37, and one and the other bearing connection portions 75 and 76 which connect the outer frame portion 72 to one and the other bearing portions 73 and 74. Then, the frame 38 is divided into a plurality of frame bodies, in the embodiment, for example, one frame body 78 integrally provided with the outer frame portion 72, one bearing portion 73, and one bearing connection portion 75 and the other frame body 79 integrally provided with the other bearing portion 74 and the other bearing connection portion 76 in the longitudinal direction. One frame body 78 and the other frame body 79 are fixed to each other in the longitudinal direction by a plurality of fixed members 80, for example, by screws, so that the stator 36 and the rotor 37 are accommodated while being interposed therebetween in the longitudinal direction.

The outer frame portion 72 is a portion in which the stator cores 41 and 41 of the stator 36 are pressed against the inner periphery by the spacers 43 and 43. As illustrated in FIGS. 1 and 5, the inner periphery of the outer frame portion 72 is provided with a regulation portion 82 which protrudes and regulates the positions of the stator cores 41 and 41 pressed by the spacers 43 and 43. The regulation portion 82 regulates the stator cores 41 and 41 in the circumferential direction which is a rotation direction of the rotor 37. Further, the outer frame portion 72 is provided with a plurality of screw holes 83 serving as fixed holes into which the fixed members 80 are threaded. For example, the screw holes are formed at four positions by penetrating in the longitudinal direction.

The regulation portion 82 is formed at the inner periphery of the outer frame portion 72 to protrude along the axial direction of the outer frame portion 72 (the axial direction of the electric blower 25 (the electric motor 31)). In the embodiment, the regulation portion 82 is disposed at the end near the outer frame portion 72 of one bearing connection portion 75. These regulation portions 82 are provided to hold both corner portions facing the frame 38 (the outer frame portion 72) of the stator core 41, that is, the corner portions 46a and 46a at both left and right ends of the connection portion 46, in other words, both left and right ends at the base end sides of the core portions 45 and 45 and regulation receiving portions 82a into which these corner portions 46a and 46a are fitted are notched in an L-shape when viewed from the longitudinal direction. In other words, a pair of the regulation portions 82 are provided at the stator cores 41. Thus, since the regulation portions 82 interpose the stator core 41 in the lateral direction (right and left direction) to regulate a movement in the lateral direction, the stator core 41 is positioned to the frame 38 in the lateral direction. Further, the regulation portion 82 is provided with a support portion 82b (FIG. 5) to protrude in the regulation receiving portion 82a for supporting the rear sides of the corner portions 46a and 46a of the stator core 41. For this reason, since the regulation portion 82 regulates a backward movement of the stator core 41, the stator core 41 is positioned to the frame 38 in the rear direction.

As illustrated in FIG. 5, one and the other bearing portions 73 and 74 are substantially cylindrical portions which hold the bearings 69 and 70 at the inner peripheries thereof. One and the other bearing portions 73 and 74 are coaxially disposed along with the outer frame portion 72.

Figure 6A:
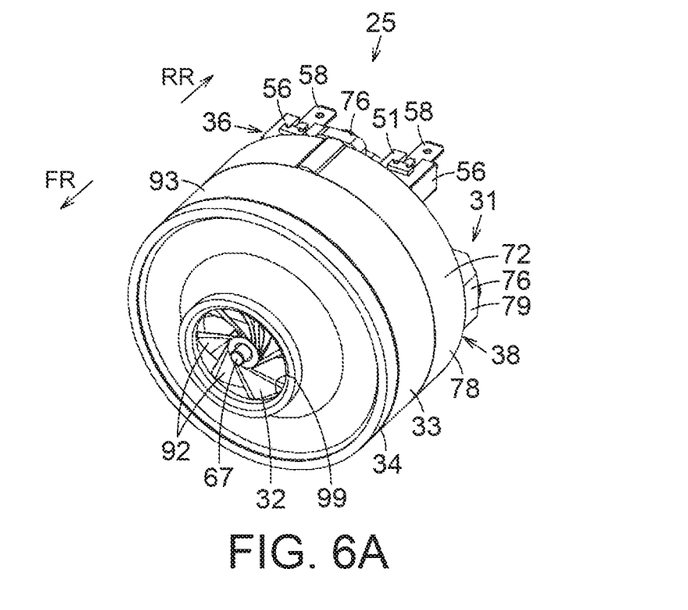
FIG. 6A is a perspective view illustrating the electric blower when viewed from the fan and FIG. 6B is a perspective view illustrating the electric blower when viewed from the electric motor.
Figure 6B:
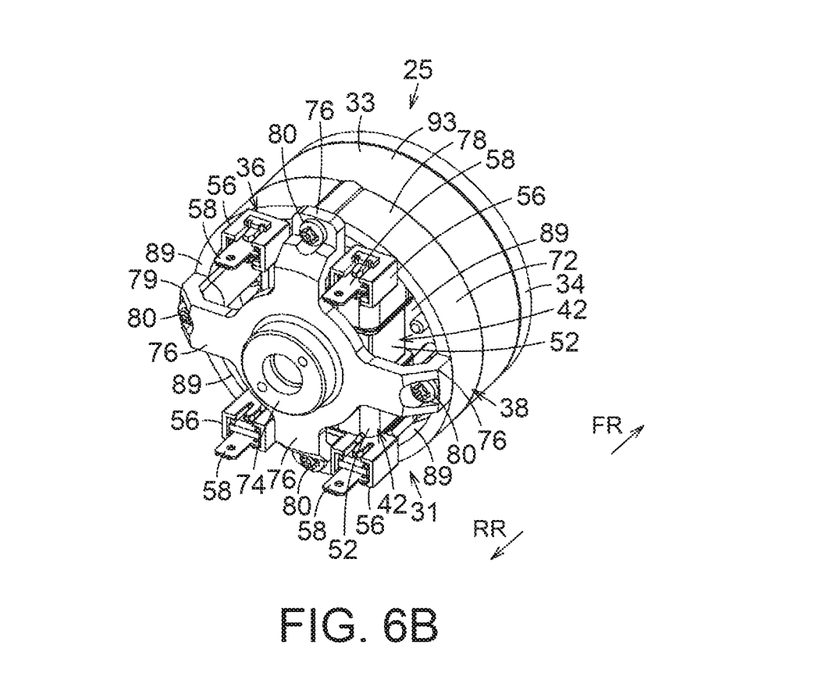

As illustrated in FIGS. 4 and 5, one and the other bearing connection portions 75 and 76 are disposed radially to connect one and the other bearing portions 73 and 74 to the outer frame portion 72. One bearing connection portion 75 is provided at a plurality of positions, for example, six positions in the lateral direction and the oblique vertical direction so that the bearing connection portions are separated from each other in the circumferential direction. Among one bearing connection portions 75, for example, one bearing connection portions 75 located at the left and right sides are provided with screw holes 86 and 86 serving as fixed hole portions into which a fixed body 85 such as a screw fixing the diffuser 33 and the electric motor 31 in the longitudinal direction is fixed. Then, a gap among one bearing connection portions 75 is formed as a plurality of, for example, six ventilation ports 87 through which air passing through the diffuser 33 flows into the electric motor 31. Further, the other bearing connection portions 76 are provided at a plurality of positions, for example, four positions in the vertical and horizontal directions to have a cross shape and are separated from each other in the circumferential direction. The front ends of the other bearing connection portions 76 are provided with insertion holes 88 through which a fixed member 80 is inserted in the longitudinal direction (FIG. 4). As illustrated in FIG. 6B, a gap among the other bearing connection portions 76 is formed as a plurality of, for example, four exhaust ports 89 through which air flowing into the electric motor 31 is discharged to the outside. The terminal portions 56 (the terminal 58) and the coil portions 42 (the coil 52) of the stator 36 are respectively disposed at the exhaust ports 89 to be exposed therefrom.

The control circuit includes, for example, a driver which includes an inverter circuit and a control section which controls the driver according to PWM and the control circuit is electrically connected to the terminal portion 56 and the position detector 65. The control circuit switches a magnetic pole (a magnetic field direction) generated at each of the core tooth portions 48 and 48 of the stator cores 41 of the stator 36 through the coil portion 42 illustrated in FIG. 1 at every period of time by controlling a current supply time and/or a current direction of a current flowing in the coil 52 by the driver.

The centrifugal fan 32 illustrated in FIGS. 4 and 5 is rotated by the electric motor 31 to straighten (guide) air from the center toward the outer periphery. The centrifugal fan 32 is formed of, for example, light metal such as aluminum or synthetic resin having excellent thermal resistance and wear resistance. Further, the centrifugal fan 32 is integrally provided with a fan body 91 which is integrally fixed to the end of the rotation shaft 67 (FIG. 6A) of the electric motor 31 and a plurality of fan blades 92 which protrude toward a front side corresponding to an opposite side to the electric motor 31 (the diffuser 33) in the fan body 91. The fan body 91 is formed in a cylindrical shape which gradually increases in diameter from one end (the front end) toward the other end (the rear end). The fan blade 92 is formed in a spiral shape which is gradually bent from the center of the fan body 91 toward the outer periphery and the fan blades are separated from each other in the circumferential direction so that air is straightened from the center toward the outer periphery by the rotation of the centrifugal fan 32 in one direction.

The diffuser is used to straighten (guide) air straightened by the centrifugal fan 32 so that the air flows into the electric motor 31. The diffuser 33 includes an annular outer frame portion 93 which has substantially the same radial dimension as that of the outer frame portion 72 of the frame 38, a body portion 94 which is located at the inside of the outer frame portion 93, and a plurality of blades 95 which connect the outer frame portion 93 and the body portion 94 to each other. And a gap between the blades 95 is formed as an air duct 96 penetrating the diffuser 33 in the longitudinal direction. Then, the body portion 94 is provided with, for example, a circular attachment opening 97 to which one bearing portion 73 of the electric motor 31 is fitted so that the rotation shaft 67 (FIG. 1) is exposed, and with passage holes 98 and 98 which serve as fixed hole portions fixing the diffuser 33 to the electric motor 31 by the fixed body 85 (FIG. 4).

The fan cover 34 is attached to the diffuser 33 to cover a part of the centrifugal fan 32. The fan cover 34 is formed in a substantially cylindrical shape having substantially the same radial dimension as that of the frame 38 (the outer frame portion 72) of the diffuser 33 and the electric motor 31. Then, the fan cover 34 is provided with an intake port 99 (suction port) which exposes the center portion of the centrifugal fan 32 and the fan cover 34 is inclined to be gradually opened from the intake port 99.

Next, an assembly procedure of the electric blower 25 of the embodiment will be described with reference to FIGS. 1 to 6.

First, the electric motor 31 is assembled. That is, the insulation body 51 is integrally molded with the preliminarily molded stator core 41 by insert-molding. Then, the coils 52 and 52 are respectively wound on the insulation body parts 54 and 54 of the insulation body 51, the ends of the coils 52 and 52 are introduced into the terminal portions 56 and 56, and the terminals 58 and 58 are press-inserted into these terminal portions 56 and 56. Thus, the terminals 58 and 58 are fixed to the terminal portions 56 and 56 while being electrically connected to the coils 52 and 52. Accordingly, the coil portion 42 is formed (see FIGS. 3A and 3B).

Next, the magnet portion 68 and the bearings 69 and 70 are attached to the rotation shaft 67 to form the rotor 37 and the bearing 69 of the rotor 37 is held by one bearing portion 73 while the rotation shaft 67 is inserted through one bearing portion 73 of one frame body 78 of the preliminarily molded frame 38.

Additionally, the corner portions 46a and 46a of the pair of stator cores 41 provided with the coil portion 42 are pressed between the left and right regulation portions 82 and 82 of one frame body 78 while being fitted to the regulation receiving portions 82a and 82a to be supported by the support portions 82b and 82b, and the spacers 43 and 43 are press-inserted from the left and right sides of the stator cores 41 and 41 which face each other in the vertical direction (see FIGS. 4 and 5). At this time, the spacers 43 and 43 are inserted to bury a space between the stator cores 41 and 41 which face each other in the vertical direction so that the spacers 43 and 43 respectively contact the stator cores 41 and 41. Then, the contact faces 61a and 61a of the spacers 43 press the pressing object faces 48b and 48b of the core tooth portions 48 and 48 of the stator cores 41 and 41 toward the rotor 37 so that a direction of a pressing force caused by the inclination of these contact faces 61a and 61a and the pressing object faces 48b and 48b is changed into a pressing force in which the stator cores 41 and 41 are pressed against the inner peripheral face of the outer frame portion 72 of the frame 38 (see FIGS. 1 and 2). At this time, since the movement of the stator cores 41 and 41 in the lateral direction, that is, the circumferential direction of the outer frame portion 72 of the frame 38 is regulated by the regulation portions 82 and 82, the stator cores 41 and 41 are pressed between each spacer 43 and the outer frame portion 72 of the frame 38 in a pressing state and also the stator cores 41 and 41 are held at a fixed position in the longitudinal direction by the core regulation portions 63 and 63 of each spacer 43 so that the stator cores 41 and 41 are linearly positioned in the radial direction with respect to the frame 38. As a result, the contact face 61a of each spacer 43 is pressed against the pressing object faces 48b and 48b of the stator cores 41 and 41, the contact faces 62a and 62a are pressed against the insulation bodies 51 and 51, and the core regulation portion 63 is pressed against the front and rear faces of the stator cores 41 and 41. Accordingly, the stator 36 is positioned to the frame 38 and the magnetic action faces 48a, 48a, 48a, and 48a of the core tooth portions 48, 48, 48, and 48 of the stator cores 41 and 41 are positioned to the outer peripheral face of the magnet portion 68 of the rotor 37 to face each other with a predetermined gap interposed therebetween.

Further, the position detectors 65 are respectively inserted into the accommodation parts 64 of the spacers 43 so that these position detectors 65 are attached to a predetermined position which is adjacent to the outer peripheral face of the magnet portion 68 of the rotor 37.

Then, one frame body 78 to which the stator 36 and the rotor 37 are assembled is covered by the preliminarily molded other frame body 79 while each insertion hole 88 is positioned to each screw hole 83 so that the bearing 70 is held by the other bearing portion 74 and the fixed member 80 inserted through each insertion hole 88 is fastened into each screw hole 83. Accordingly, one and the other frame bodies 78 and 79 are fixed so that the stator 36 and the rotor 37 are interposed therebetween (see FIGS. 4 and 5). In this state, each terminal portion 56 (the terminal 58) and each coil portion 42 (the coil 52) are exposed from each exhaust port 89 (see FIGS. 6A and 6B).

Next, one bearing portion 73 of the electric motor 31 assembled in this way is fitted into the attachment opening 97 of the diffuser 33 and the fixed body 85 is inserted through the passage holes 98 and 98 to be threaded into the screw holes 86 and 86 of the electric motor 31.

Accordingly, the electric motor 31 and the diffuser 33 are fixed. Then, the centrifugal fan 32 is attached to the rotation shaft 67 of the electric motor 31 protruding from the attachment opening 97 of the diffuser 33 and the fan cover 34 is press-inserted or adhered to the diffuser 33 to cover the centrifugal fan 32. Accordingly, the electric blower 25 is obtained (see FIGS. 4 and 5).

In the electric blower 25 assembled in this way, the rotation position of the rotor 37 is detected by the position detectors 65 and 65. In this state, a current supply time and a current direction of a current flowing in the coil 52 of each coil portion 42 are controlled by the control circuit in response to the rotation position. Accordingly, magnetic poles are sequentially formed at the core tooth portion 48 and these magnetic poles push (repulsion) or pull (attracting) the magnetic pole of the rotor 37, thereby rotating the rotor 37. As a result, the centrifugal fan 32 connected to the rotor 37 rotates at a high speed (for example, about 100000 rpm). Here, the vacuum cleaner 11 (FIG. 7) in which the electric blower 25 is assembled to the main body 21 suctions dust of a cleaning object face together with air through the floor brush 14 by a negative pressure generated by the rotation of the centrifugal fan 32 of the electric blower 25 and traps the dust by the dust collection device 22. The air having dust passes through the dust collection device 22 and is suctioned from the intake port 99 illustrated in FIGS. 4, 5, and 6A into the electric blower 25. Then, the suctioned air is straightened to the periphery of the centrifugal fan 32 by the centrifugal fan 32, and is straightened by the diffuser 33 illustrated in FIG. 4 so that the air flows from the air duct 96 into the electric motor 31 through the ventilation port 87. Then, the air passes through the frame 38 of the electric motor 31 while cooling the electric motor 31 (the stator 36 and the rotor 37), and is discharged from the exhaust port 89 illustrated in FIG. 6(b) while cooling each coil portion 42 (the coil 52) and each terminal portion 56 (the terminal 58). Next, the air is discharged from an exhaust hole (not illustrated) opened in the main body 21 to the outside of the main body 21.

According to the above-described embodiment, the stator cores 41 and 41 are respectively pressed against the frame 38 by the spacers 43 and 43 inserted between the stator cores 41 and 41. The frame 38 is provided with the regulation portions 82, 82, 82, and 82 which regulate the positions of the stator cores 41 and 41 pressed by the spacers 43 and 43 in the circumferential direction which is a rotation direction of the rotor 37. Accordingly, it is possible to easily position the plurality of stator cores 41 to the frame 38 while ensuring reliability.

According to the embodiment, since a thermal load or a mechanical load is not applied to the coil 52 as in, for example, a configuration in which the bridge portion is integrally molded between the stator cores 41 and 41, it is possible to easily position the plurality of stator cores 41 to the frame 38 while ensuring reliability.

Then, since the stator cores 41 and 41 can be separately assembled to the frame 38, the assembly can be performed even when a distance between the core tooth portions 48 and 48 of the stator cores 41 and 41 is smaller than the outer diameters of each of the bearings 69 and 70 and thus assemblability is more improved.

Further, since the spacers 43 and 43 are disposed to be respectively filled between the stator cores 41 and 41 and between the insulation bodies 51 and 51 of the coil portions 42 and 42, the stator cores 41 and 41 can be reliably held and positioned by the spacers 43 even when the areas of the ends of the insulation bodies 51 and 51 or the pressing object faces 48b and 48b of the stator cores 41 and 41 are narrow.

Additionally, since the position detector 65 is accommodated in the accommodation part 64 provided in each spacer 43, the position detector 65 can be disposed at a position closer to the magnet portion 68 of the rotor 37. Accordingly, it is possible to improve the detection accuracy of the rotation position of the rotor 37 and to control the rotation with high accuracy.

Further, since each spacer 43 is formed of a non-magnetic body, a magnetic path of the stator 36 is not influenced and a bad effect such as degradation in output does not occur.

Additionally, since the electric blower 25 is used for the vacuum cleaner 11, the rotation speed is high and a vibration is easily generated. For this reason, since each spacer 43 is formed of a material softer than the frame 38, a vibration can be absorbed by each spacer 43 and thus noise or rattling caused by a vibration can be prevented.

Additionally, two (one pair) stator cores 41 are provided in the above-described embodiment, but three or more stator cores may be used.

Further, the spacers 43 can be a structure filled between the stator cores 41 and 41 or between the insulation bodies 51 and 51 in response to the widths of the target pressing faces 48b and 48b of the core tooth portions 48 and 48 of the stator cores 41 and 41 or the widths of the ends of the insulation body parts 54 and 54 of the insulation bodies 51 and 51.

Additionally, each spacer 43 may be formed of a conductor as long as the spacer is insulated from the stator cores 41 and 41.

Then, the vacuum cleaner 11 is not limited to a stick type. For example, a canister type in which an air duct including a hose body is connected to the cleaner body 12 traveling on a cleaning object face or a robot type in which a cleaning object face is cleaned while the cleaner body autonomously travels thereon can be employed.

When an embodiment of the invention has been described, the embodiment is merely an example and does not limit the scope of the invention. The novel embodiment can be modified into various forms and various omissions, substitutions, and modifications thereof can be made without departing from the spirit of the invention. The embodiment or the modification thereof is included in the scope or the spirit of the invention and is included in the invention of claims and the equivalent range thereof.

While certain embodiments have been described, these embodiments have been presented by way of example only, and are not intended to limit the scope of the inventions. Indeed, the novel embodiments described herein may be embodied in a variety of other forms; furthermore, various omissions substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric blower comprising:
    an electric motor; and
    a fan rotated by the electric motor,
    wherein
    the electric motor includes a stator, a rotor connected to the fan, and a frame accommodating the stator and the rotor,
    the stator includes a plurality of stator cores respectively having a core tooth portion facing the rotor, a coil portion attached to each stator core to form a magnetic pole at the core tooth portion, and a spacer inserted between the stator cores to press the stator cores against the frame, and
    the frame includes a regulation portion regulating a position of the stator cores pressed by the spacer.

2. The electric blower according to claim 1,
    wherein the spacer is disposed to be filled between the stator cores.

3. The electric blower according to claim 1,
    wherein the coil portion includes a coil formed by a conductor and an insulation body attached to the stator core to insulate the stator core and the coil, and
    the spacer is disposed to be filled between the insulation bodies of the coil portions.

4. The electric blower according to claim 1,
    wherein the coil portion includes a coil formed by a conductor and an insulation body attached to the stator core to insulate the stator core and the coil, and
    the spacer is disposed to be filled between the stator cores and between the insulation bodies of the coil portions.

5. The electric blower according to claim 1,
    wherein a contact face of the spacer and a face to be pressed of a corresponding stator core are inclined.

6. The electric blower according to claim 1,
    wherein spacers are respectively inserted from both sides of the stator cores.

7. The electric blower according to claim 1,
    wherein the regulation portion of the frame regulates the position of the stator cores in a rotation direction of the rotor.

8. The electric blower according to claim 1,
    wherein the stator cores are regulated in a longitudinal direction by the regulation portion.

9. The electric blower according to claim 1,
    a plurality of regulation portions are arranged in the frame.

10. The electric blower according to claim 1,
    wherein each stator core is formed in a C-shape.

11. The electric blower according to claim 1, further comprising:
    a position detector detecting a rotation position of the rotor,
    wherein the spacer includes an accommodation part located between the stator cores, and at least a part of the position detector is accommodated therein.

12. The electric blower according to claim 1,
    wherein the spacer is formed of a non-magnetic body.

13. The electric blower according to claim 1,
    wherein the spacer is formed of a material softer than the frame.

14. A vacuum cleaner comprising:
    the electric blower according to claim 1; and
    a dust collection part trapping dust suctioned together with air by an operation of the electric blower.

* * * * *